Patented Mar. 30, 1937

2,075,456

UNITED STATES PATENT OFFICE 2,075,456

COMPOUNDS OF THE DIBENZANTHRONE SERIES

Heinrich Neresheimer and Anton Vilsmeier, Ludwigshafen-on-the-Rhine, Germany, assignors to General Aniline Works, Inc., New York, N. Y., a corporation of Delaware No Drawing. Application May 2, 1935, Serial No. 19,531. In Germany May 4, 1934

4 Claims. (Cl. 260—61)

The present invention relates to reduction products of nitro derivatives of the dibenzanthrone series and a process of producing same.

We have found that valuable compounds are obtained by treating Bz3,Bz3'-dinitrodibenzanthrone-Bz2,Bz2'-quinones with reducing agents.

The starting materials suitable for the purpose of the present invention can, for example, be prepared according to our copending application Ser. No. 19,530, filed May 2, 1935, wherein it is disclosed that nitro derivatives of the dibenzanthrone series are obtained by the treatment of the Bz2,Bz2'-quinones of the dibenzanthrone series, which are obtainable, for example, by the action of pyrolusite in sulfuric acid on dibenzanthrone or 2,2'-dibenzanthronyl, with nitrating agents. The said reduction may be carried out by means of dialkylanilines, phenols in the presence of sulfuric acid, solutions of sulfites of alkali metals, ferrous salts or metal powders in the presence of sulfuric acid, or alkaline hydrosulfite solution. Depending on the reaction conditions, the duration of treatment and the strength of the reducing agent, reduction products of different compositions can be obtained. Thus, for example, by treating Bz3,Bz3'-dinitrodibenzanthrone-Bz2,Bz2'-quinone with an aqueous solution of sodium sulfite, or with phenol or ferrous sulphate in the presence of concentrated sulfuric acid, the corresponding dinitrodihydroxydibenzanthrone is formed. By treating the said initial substance with copper powder in the presence of sulfuric acid, or with an alkaline sodium hydrosulfite solution, depending on the temperature and the reaction period, the corresponding di- or mono-aminodihydroxyldibenzanthrones are obtained.

The new compounds are in part dyestuffs and in part valuable intermediate products for the preparation of dyestuffs and are generally obtained in good yields.

The following examples will further illustrate how the said invention may be carried out in practice, but the invention is not restricted to these examples. The parts are by weight.

Example 1

100 parts of Bz3,Bz3'-dinitrodibenzanthrone-Bz2,Bz2'-quinone (obtainable according to the said copending application Ser. No. 19,530, i. e., by treating dibenzanthrone-Bz2,Bz2'-quinone with 98 per cent nitric acid, in the presence of glacial acetic acid, at from about 70° to 80° C.), which has been brought into a state of fine dispersion by dissolution in and precipitation from concentrated sulfuric acid, is boiled under reflux in 5000 parts of water with 200 parts of crystallized sodium sulfite for two hours. The green crystals formed are filtered off by suction, washed with a little hot water and dried. The resulting compound is soluble in pyridine giving a green coloration and upon the addition of acetic anhydride the solution shows a strong red fluorescence. The compound is practically completely soluble in hot water and yields fast green shades on wool from an acid bath. According to analysis the compound contains two atoms of nitrogen in the molecule.

Example 2

100 parts of phenol are introduced while stirring into a solution of 100 parts of the compound employed as starting material in Example 1 in 2000 parts of 96 per cent sulfuric acid, the solution, original blue-violet, rapidly assuming a turbid carmine red color. The whole is stirred for some time and then poured into water and worked up in the usual manner. The green dyestuff thus obtained is similar to that described in the first paragraph of Example 1.

The same dyestuff can be obtained by employing a mixture of ferrous sulfate and dilute sulfuric acid or an aqueous solution of hydrazine hydrate as reducing agents.

Example 3

100 parts of the compound employed as starting material in Example 1 in 4000 parts of water are treated at room temperature with 550 parts of caustic soda solution of 40° Baumé strength and 400 parts of sodium hydrosulfite while stirring. The whole is then heated for from about one to two hours at from 90° to 95° C. and the resulting greenish blue vat allowed to cool to room temperature. The deposited green crystalline mass is filtered off by suction and washed with cold water. Air is led through the filter residue while suspended in water in order to oxidize the leuco compound completely and the whole is then acidified with a little acetic acid; the residue is filtered off by suction, washed until neutral and dried. The product obtained in a practically quantitative yield dissolves in concentrated sulfuric acid giving a violet coloration and in pyridine giving a green coloration which changes to red when acetic anhydride is added. By treating it with an alkaline hydrosulfite solution it yields even in the cold a blue vat from which cotton is dyed blue-green shades. According to analysis and its properties, the compound is a monoaminodihydroxydibenzanthrone. It may be purified by recrystallization in stages from sulfuric acid.

*Example 4*

100 parts of the compound employed as starting material in Example 1 are finely dispersed by dissolution in and precipitation from concentrated sulfuric acid and made into a paste together with 2250 parts of water. This paste is introduced at 20° C. into a mixture of 2750 parts of sodium hydroxide solution of 40° Baumé strength, 2750 parts of water and 870 parts of sodium hydrosulfite, while stirring well. The mixture is then heated at from 40° to 50° C. until the initial material has completely been converted into a green-blue vat. The reaction product is then precipitated by leading in air into the mixture and rendering it acid. It is then filtered off by suction, washed with water and dried. It is substantially diamino-dihydroxydibenzanthrone and may be purified by reprecipitating its sulfate in stages from sulfuric acid.

If the compound obtainable according to the first paragraph is treated under mild conditions with an alkaline sodium-hydrosulfite solution a compound is obtained which is substantially a diamino-dihydroxydibenzanthrone. It may be purified, if desired, by recrystallization of the sulfate from sulfuric acid in stages. It is difficultly vattable in the cold by means of alkaline sodium hydrosulfite solution. By warming this liquid the dyestuff is dissolved giving a greenish-blue coloration. It dyes cotton blue-grey shades.

*Example 5*

155 parts of copper powder are introduced into a solution of 192 parts of the compound employed as starting material in Example 1, and 250 parts of boric acid in 3800 parts of sulfuric acid monohydrate at about 20° C. in the course of about 4 hours. Then the remaining copper powder is filtered off by suction. By adding such a quantity of water that the solution has a content of about 85% of sulfuric acid, the sulfate of the diamino-dihydroxydibenzanthrone described in the second paragraph of Example 4, is precipitated from the sulfuric acid filtrate.

*Example 6*

Copper powder is introduced into a solution of 288 parts of the compound employed as starting material in Example 1 in 5700 parts of concentrated sulfuric acid at about 50° C. until a sample of the mixture no longer contains unchanged diamino-dihydroxydibenzanthrone. After filtering off the copper powder and pouring the filtrate into water, monoaminodihydroxydibenzanthrone is precipitated which can readily be purified by reprecipitating it in stages from about 90% sulfuric acid.

What we claim is:—

1. Compounds of the dibenzanthrone series corresponding to the general formula

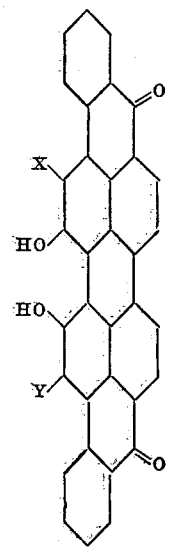

in which both X and Y stand for a member of the group consisting of hydrogen, $NO_2$ and $NH_2$ or wherein X stands for $NH_2$ and Y for hydrogen.

2. Bz3.Bz3'-dinitro-Bz2.Bz2'-dihydroxydibenzanthrone.

3. Bz3.Bz3'-diamino-Bz2.Bz2'-dihydroxydibenzanthrone.

4. Bz3-amino-Bz2.Bz2'-dihydroxydibenzanthrone.

HEINRICH NERESHEIMER.
ANTON VILSMEIER.

CERTIFICATE OF CORRECTION.

Patent No. 2,075,456. March 30, 1937.

HEINRICH NERESHEIMER, ET AL.

It is hereby certified that error appears in the printed specification of the above numbered patent requiring correction as follows: Page 2, second column, line 41-42, claim 1, strike out the words "or wherein X stands for $NH_2$ and Y for hydrogen; and that the said Letters Patent should be read with this correction therein that the same may conform to the record of the case in the Patent Office.

Signed and sealed this 19th day of October, A. D. 1937.

Henry Van Arsdale.
Acting Commissioner of Patents.

(Seal)